(12) United States Patent
Hara

(10) Patent No.: US 8,413,934 B2
(45) Date of Patent: Apr. 9, 2013

(54) PIPE FIXING STRUCTURE FOR CYLINDER TUBE

(75) Inventor: Takahiko Hara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 12/996,048

(22) PCT Filed: Mar. 26, 2010

(86) PCT No.: PCT/JP2010/056042
§ 371 (c)(1),
(2), (4) Date: Dec. 3, 2010

(87) PCT Pub. No.: WO2010/122891
PCT Pub. Date: Oct. 28, 2010

(65) Prior Publication Data
US 2011/0073719 A1    Mar. 31, 2011

(30) Foreign Application Priority Data

Apr. 23, 2009  (JP) ................................ 2009-104887
Apr. 23, 2009  (JP) ................................ 2009-104889

(51) Int. Cl.
*F16L 3/22* (2006.01)
(52) U.S. Cl. .......... 248/68.1; 248/65; 248/69; 248/74.1; 248/74.3; 248/218.4; 248/219.4; 138/108; 138/113
(58) Field of Classification Search ............ 248/49, 248/62, 65, 68.1, 69, 70, 73, 74.1, 74.3, 75, 248/213.4, 219.1, 229.1, 229.14, 229.2, 229.24, 248/227.3, 230.5, 230.6, 230.9, 231.71, 231.81, 248/230.1, 218.4, 219.4; 138/108, 113; 24/335, 24/339

See application file for complete search history.

(56) References Cited

U.S. PATENT DOCUMENTS

|  |  |  |  |  |
|---|---|---|---|---|
| 978,398 A | * | 12/1910 | Rischard | 24/339 |
| 1,774,775 A | * | 9/1930 | Weitz, Jr. | 248/229.26 |
| 3,385,545 A | * | 5/1968 | Patton | 248/68.1 |
| 4,103,853 A | * | 8/1978 | Bannan | 248/219.1 |
| 4,767,087 A | * | 8/1988 | Combu | 248/62 |
| 4,783,030 A | * | 11/1988 | Buerhop | 248/74.4 |
| 5,035,383 A | * | 7/1991 | Rainville | 248/68.1 |
| 5,193,774 A | * | 3/1993 | Rogers | 248/219.4 |
| 5,320,312 A | * | 6/1994 | Hoenninger | 248/68.1 |

(Continued)

FOREIGN PATENT DOCUMENTS

JP  48-103745  12/1973
JP  61-187861  11/1986

(Continued)

*Primary Examiner* — Terrell McKinnon
*Assistant Examiner* — Michael McDuffie
(74) *Attorney, Agent, or Firm* — Rabin & Berdo, P.C.

(57) ABSTRACT

A bracket (20) that is fixed to a band (10) mounted on an outer peripheral surface (2*a*) of a cylinder tube (2) supports a pipe (4). The band (10) includes a first tab (11*a*) projecting outward in a radial direction and a second tab (11*b*) projecting outward in the radial direction. The bracket (20) supporting the pipe (4) is formed with an inverted U-shaped cross-section constituted by a pair of leg plate portions (20*a*) and a top plate portion (20*b*) formed integrally with the leg plate portions (20*a*) to join the leg plate portions (20*a*). The pair of leg plate portions (20*a*) are fixed to the first tab (11*a*) and the second tab (11*b*) by a bolt, and a small and lightweight pipe fixing structure is thus realized.

10 Claims, 6 Drawing Sheets

U.S. PATENT DOCUMENTS

| | | | | |
|---|---|---|---|---|
| 5,405,113 A * | 4/1995 | Jaw | | 248/229.1 |
| 5,669,589 A * | 9/1997 | Janssen et al. | | 248/65 |
| 5,689,862 A * | 11/1997 | Hayes et al. | | 24/284 |
| 5,703,330 A * | 12/1997 | Kujawski | | 174/72 A |
| 5,730,547 A * | 3/1998 | Nogami | | 403/384 |
| 5,752,681 A * | 5/1998 | Janssen et al. | | 248/65 |
| 5,897,082 A * | 4/1999 | Losada | | 248/65 |
| 6,095,386 A * | 8/2000 | Kuo | | 224/448 |
| 6,408,492 B1 * | 6/2002 | Sparks et al. | | 24/336 |
| 6,486,402 B2 * | 11/2002 | Harger et al. | | 174/78 |
| 6,881,004 B2 * | 4/2005 | Handke | | 403/384 |
| 7,140,579 B2 * | 11/2006 | Kirschner | | 248/74.1 |
| 7,384,018 B2 * | 6/2008 | Moretto | | 248/74.1 |
| 7,533,854 B2 * | 5/2009 | Aube | | 248/95 |
| 8,047,476 B2 * | 11/2011 | Van Walraven | | 248/74.4 |
| 2005/0045786 A1 * | 3/2005 | Tupper et al. | | 248/229.2 |
| 2005/0230569 A1 | 10/2005 | Kirschner | | |
| 2007/0051860 A1 * | 3/2007 | Hyslop et al. | | 248/230.1 |
| 2009/0032650 A1 * | 2/2009 | Maehara et al. | | 248/65 |

FOREIGN PATENT DOCUMENTS

| | | |
|---|---|---|
| JP | 6-56506 | 8/1994 |
| JP | 2001-314012 A | 11/2001 |
| JP | 2004-364358 A | 12/2004 |
| JP | 2008-057606 A | 3/2008 |
| KR | 0178844 | 3/1999 |

* cited by examiner

_US 8,413,934 B2_

PIPE FIXING STRUCTURE FOR CYLINDER TUBE

FIELD OF THE INVENTION

This invention relates to a structure for fixing a working fluid pipe in the vicinity of an outer periphery of a cylinder tube such as a fluid pressure cylinder.

BACKGROUND OF THE INVENTION

In a fluid pressure cylinder that drives a boom of a working machine, a working fluid pipe is fixed to a side face of a cylinder tube, for example. To prevent the pipe from vibrating, prevent looseness in a pipe connecting portion, and increase the compactness of a disposal space including the cylinder tube, the pipe is preferably disposed in close contact with the cylinder tube.

JP2008-057606A, published by the Japan Patent Office in 2008, proposes a fixing structure for fixing this type of pipe to a cylinder tube.

The pipe fixing structure proposed in the prior art includes a pair of bands fastened to the cylinder tube, and a sheet metal bracket welded to one of the bands. A block-shaped clamp is fixed to the bracket by a bolt and a nut. The pipe is sandwiched between the clamp and the bracket.

SUMMARY OF THE INVENTION

In this pipe structure, every time an attachment position for attaching the pipe to the cylinder tube and an outer diameter of the cylinder tube are modified, component dimensions and a welding position for welding the bracket to the band must be modified.

Further, since a block-shaped clamp is used, a diameter of the clamp must be increased when the diameter of the pipe is increased. As a result, increases occur in the size and weight of the pipe structure including the clamp and the bracket. Moreover, since the bracket is welded to the band, a thickness of the band must be increased to ensure that the band is not broken by an external force such as vibration. This also leads to an increase in the weight of the pipe structure.

It is therefore an object of this invention to realize a pipe fixing structure for a cylinder tube that is small and lightweight and can cope with a wide range of variation in a diameter of a cylinder tube and an attachment position of a pipe.

To achieve this object, this invention provides a pipe fixing structure that supports a pipe on a cylinder tube, comprising a band fastened to an outer periphery of the cylinder tube, the band comprising a first tab that projects outward in a radial direction and a second tab that projects outward in the radial direction, and a bracket that supports the pipe, wherein the bracket is formed with an inverted U-shaped cross-section constituted by a pair of leg plate portions and a top plate portion formed integrally with the leg plate portions to join the leg plate portions, and the pair of leg plate portions are fixed to the first tab and the second tab by a bolt.

This invention also provides a fluid pressure cylinder that supports a pipe on a cylinder tube, comprising a band fastened to an outer periphery of the cylinder tube, the band comprising a first tab that projects outward in a radial direction and a second tab that projects outward in the radial direction, and a bracket that supports the pipe, wherein the bracket is formed with an inverted U-shaped cross-section constituted by a pair of leg plate portions and a top plate portion formed integrally with the leg plate portions to join the leg plate portions, and the pair of leg plate portions are fixed to the first tab and the second tab by a bolt.

Details of this invention as well as other features and advantages thereof are set forth in the following description of the specification and illustrated in the attached drawings.

DESCRIPTION OF THE PREFERRED EMBODIMENTS

Figure 1:
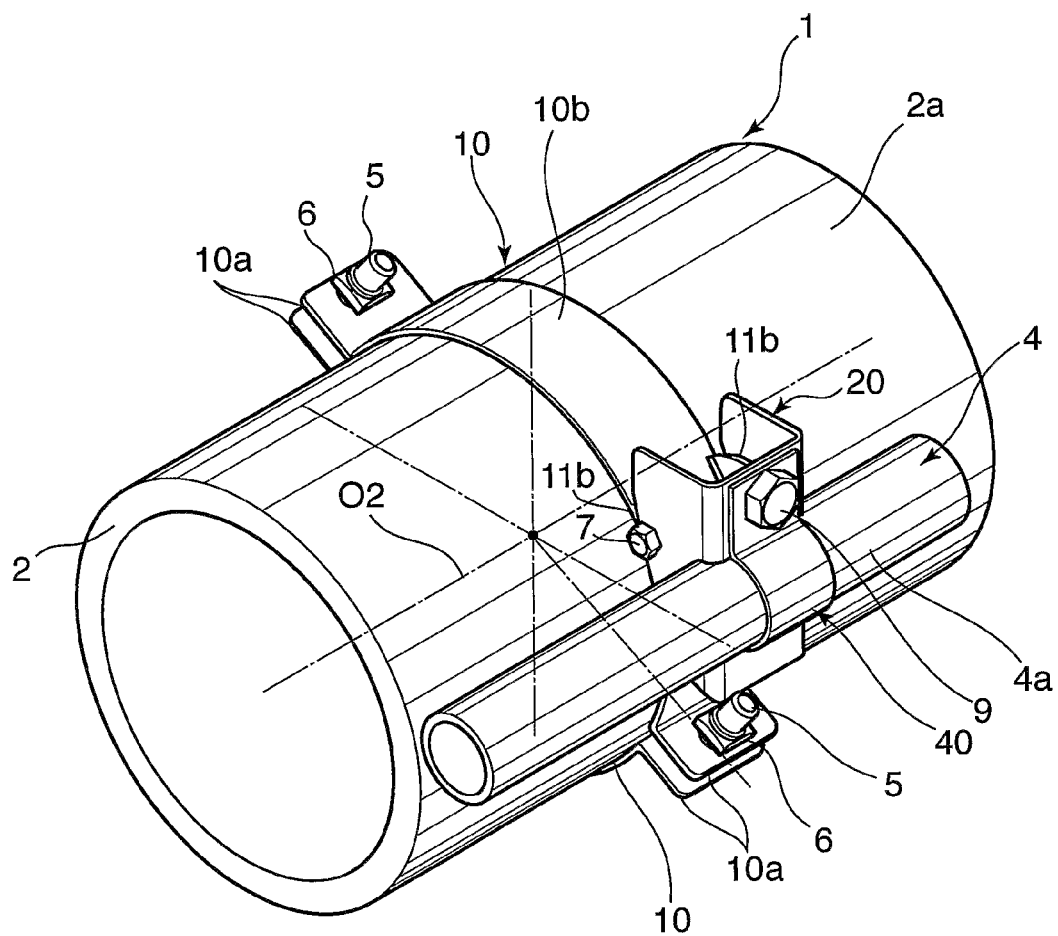
FIG. 1 is a cut-away perspective view of the principal parts of a fluid pressure cylinder, illustrating a pipe fixing structure according to an embodiment of this invention.

Referring to FIG. 1 of the drawings, a fluid pressure cylinder 1 that drives a boom or the like of a working machine, for example, is formed inside a cylinder tube 2 and activated by a working fluid pressure supplied through a pipe 4. Working oil, for example, is used as the working fluid. Instead of working oil, a water-soluble replacement liquid or air may be used.

The pipe 4 is fixed to an outer periphery of the cylinder tube 2 using a pipe fixing structure according to this invention.

The pipe fixing structure includes a pair of bands 10 wrapped fixedly around an outer peripheral surface 2a of the cylinder tube 2, a bracket 20 fixed to the band 10, and a clamp 40 that grips the pipe 4 in combination with the bracket 20. As shown in the figure, the pipe 4 is supported parallel to the cylinder tube 2 via the pipe fixing structure.

Figure 2:
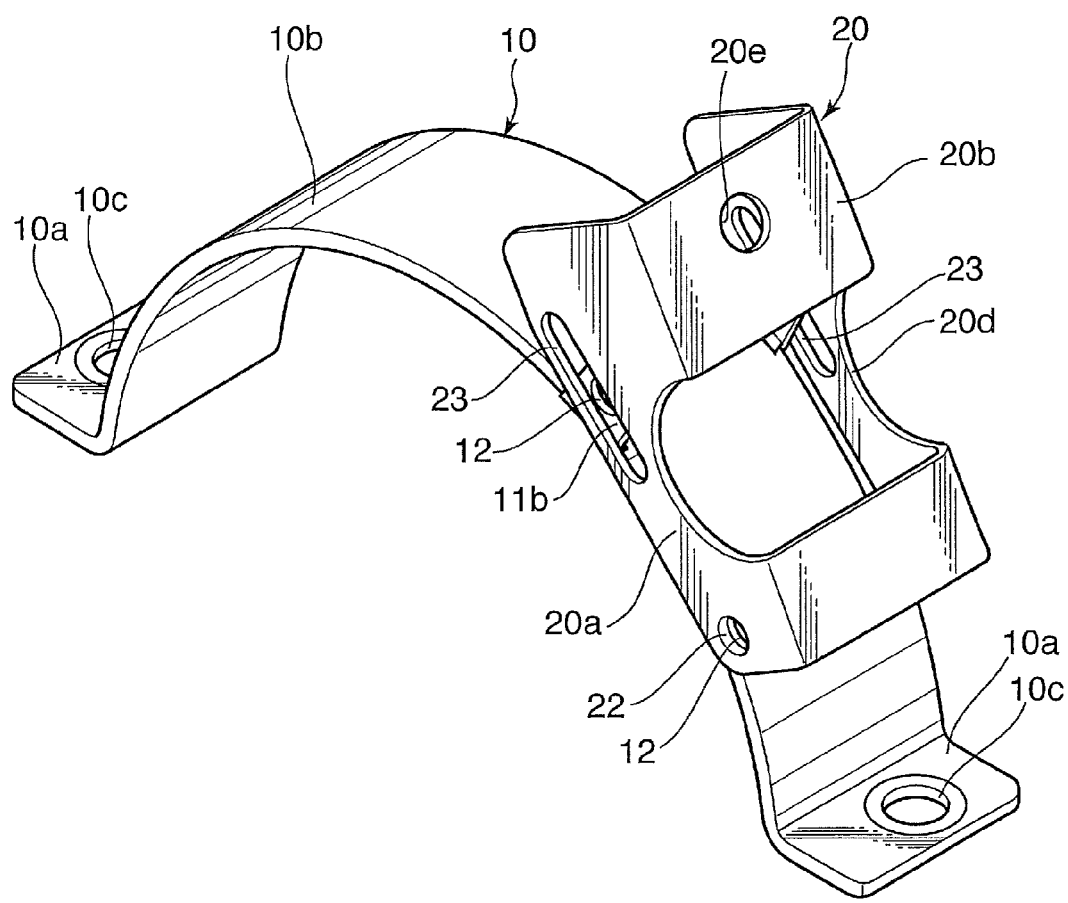
FIG. 2 is a perspective view of a band and a bracket according to the embodiment of this invention.
Figure 3:
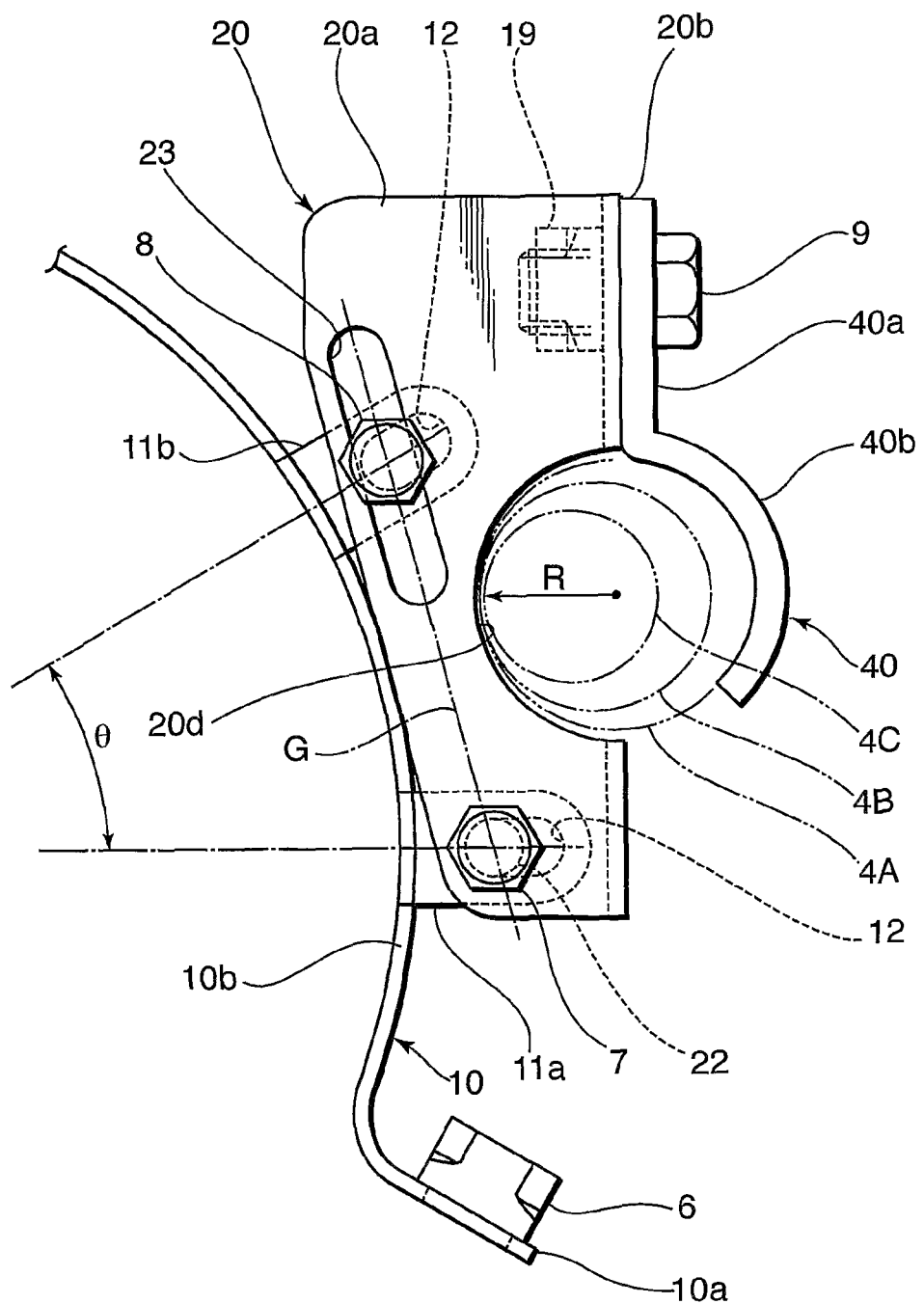
FIG. 3 is a side view of the bracket and a clamp according to the embodiment of this invention.

Referring to FIGS. 2 and 3, the band 10 is formed from sheet metal. The band 10 is constituted by a band plate-shaped main body portion 10b fixed to the outer peripheral surface 2a of the cylinder tube 2, a pair of first tabs 11a that project radially outward from either axial end of the main body portion 10b fixed to the outer peripheral surface 2a of the cylinder tube 2, and a similar pair of second tabs 11b provided at an angular interval θ from the pair of first tabs 11a. The main body portion 10b is formed with an arc-shaped cross-section of substantially 180 degrees in order to cover substantially half of the circumference of the cylinder tube 2. A joining portion 10a bent in a radial direction is formed on either circumferential direction end of the main body portion 10b. A joining hole 10c is formed in each joining portion 10a.

Referring back to FIG. 1, the band 10 is fixed to the cylinder tube 2 as follows. The two bands 10 are wrapped around the cylinder tube 2 such that the joining portions 10a of one band 10 oppose the joining portions 10a of the other band 10, whereupon tip ends of bolts 5 inserted into the joining holes 10c formed in the opposing joining portions 10a are screwed to nuts 6. The nuts 6 are fixed to one of the joining portions 10a of each band 10 in advance by welding.

Assuming that an outer diameter of the cylinder tube 2 is D, a cross-section of the main body portion 10b of the band 10 forms an arc having a curvature radius of substantially D/2.

In the band 10, the main body portion 10b, the joining portions 10a, the pair of first tabs 11a, and the pair of second tabs 11b are formed integrally in advance by press-molding sheet metal cut into predetermined shapes. When the pipe fixing structure is applied to a cylinder tube 2 having a different outer diameter, a band having a curvature radius R that is ½ the outer diameter D of the cylinder tube 2 is used.

Fixing holes 12 for fixing the bracket 20 are formed coaxially in the pair of first tabs 11a and the pair of second tabs 11b, respectively. The fixing holes 12 are preferably formed as elongated holes extending in a radial direction so that minute adjustments can be made to relative positions of the band 10 and the bracket 20.

The bracket 20 is constituted by a pair of leg plate portions 20a, and a top plate portion 20b formed integrally with the leg plate portions 20a to join the leg plate portions 20a. The bracket 20 thus formed has an inverted U-shaped cross-section. In the figures, the top plate portion 20b is formed to be flat, but the top plate portion 20b may be formed with an arched cross-section.

The leg plate portion 20a is formed with a first bolt hole 22 having a circular cross-section and a second bolt hole 23 having an elliptical cross-section. The second bolt hole 23 having the elliptical cross-section is formed along a bolt hole base line G linking a center of the first bolt hole 22 to a center of the second bolt hole 23. More precisely, the second bolt hole 23 is formed such that a long axis of the elliptical cross-section is positioned on the bolt hole base line G. Two first bolt holes 22 and two second bolt holes 23 are respectively positioned coaxially in the bracket 20.

A transverse direction dimension of the bracket 20 is set such that respective inner surfaces of the two leg plate portions 20a fit onto respective outer surfaces of the pair of first tabs 11a and the pair of second tabs 11b.

Figure 4:
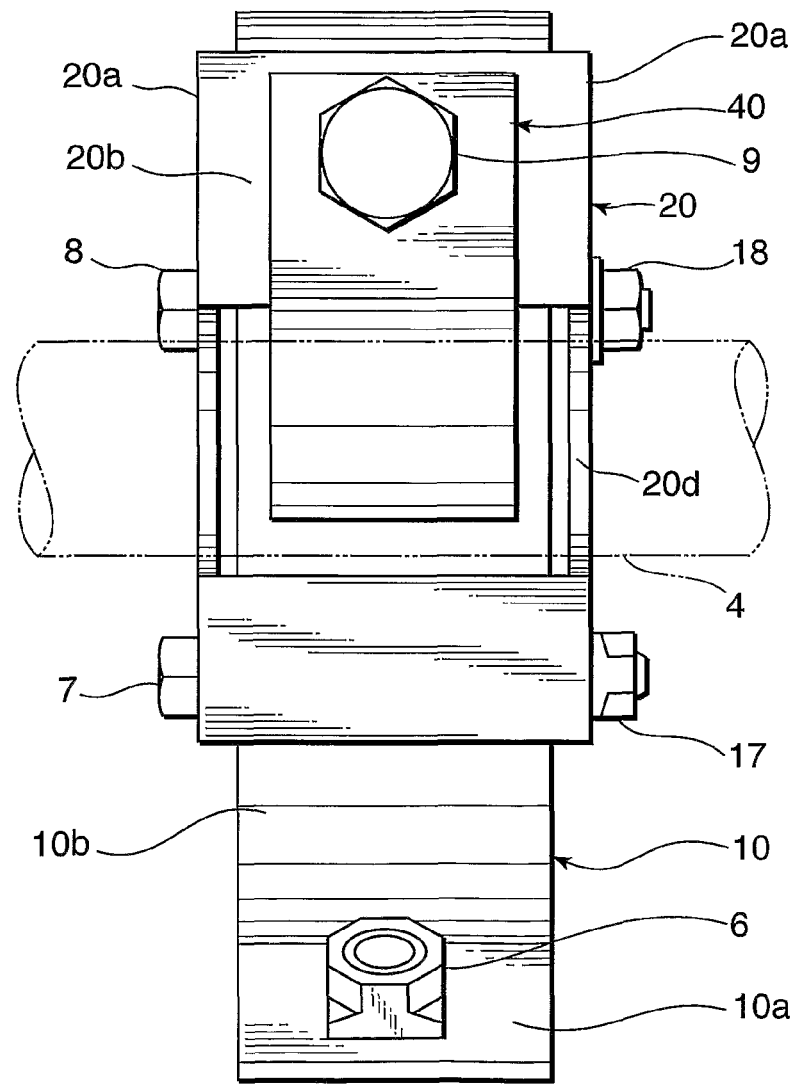
FIG. 4 is a front view of the bracket and the clamp.

Referring to FIGS. 3 and 4, a bolt 7 penetrates the two first bolt holes 22 in the two leg plate portions 20a of the bracket 20 and the two fixing holes 12 of the pair of first tabs 11a positioned on the inside thereof, and a nut 17 is fastened to a penetrating end of the bolt 7. Further, a bolt 8 penetrates the two second bolt holes 23 in the two leg plate portions 20a and the two fixing holes 12 of the pair of second tabs 11b positioned on the inside thereof, and a nut 18 is fastened to a penetrating end of the bolt 8. Thus, the bracket 20 is fixed to the band 10.

A notch 20d for receiving the pipe 4 is formed in the bracket 20. The notch 20d has an arc-shaped cross-section that is oriented radially outward when seen from a direction of a central axis O2 of the cylinder tube 2 in a state where the bracket 20 is fixed to the cylinder tube 2 via the band 10.

The bracket 20 is formed integrally by press-molding sheet metal cut in advance into a predetermined shape including the notch 20d.

The clamp 40 is constituted by a flat plate-shaped base portion 40a fixed to the top plate portion 20b by a bolt 9 and a nut 19, and a tip end portion 40b formed integrally with one end of the base portion 40a. A hole 20e for fixing the base portion 40a is formed in the top plate portion 20b of the bracket 20. The nut 19 is fixed to a periphery of the hole 20e in advance by welding. The tip end portion 40b is formed with an arc-shaped cross-section that corresponds to the notch 20d formed in the bracket 20. The clamp 40 is formed by press-molding sheet metal cut in advance into a predetermined shape.

To fix the pipe 4 to the bracket 20, the base portion 40a of the clamp 40 is fixed to the top plate portion 20b by the bolt 9 and the nut 19 while the pipe 4 is seated on the notch 20d. As a result, the pipe 4 is sandwiched between the bracket 20 and the clamp 40 supported on the bracket 20 in cantilever fashion, and therefore the pipe 4 is prevented from falling out of the notch 20d.

Here, the arc-shaped cross-section of the notch 20d in the bracket 20 and the arc-shaped cross-section of the tip end portion 40b of the clamp 40 are both set with a radius R. The pipe fixing structure has been designed with the aim of supporting a pipe 4A having the radius R, a pipe 4B having a smaller diameter than the pipe 4A, or a pipe 4C having an even smaller diameter. In other words, the radius R is set to be equal to a maximum pipe diameter that can be supported by the bracket 20. When the pipe fixing structure is applied to the pipe 4B or the pipe 4C, a clamp 40 having a smaller radius R on the arc-shaped cross-section of the tip end portion 40b is used. In other words, according to this pipe fixing structure, a plurality of pipes 4 having difference radii R can be accommodated by replacing the clamp 40 alone, i.e. without replacing the bracket 20.

On the other hand, if the clamp 40 is formed by a spring material that is capable of elastic deformation in the radial direction of the figure, pipes 4 of different diameters can be held in the notch 20d using the same clamp 40. In this case, the clamp 40 is preferably formed with a cantilever structure in which the base portion 40a is fixed so that the clamp 40 is capable of elastic deformation in the radial direction of the clamp 40.

Figure 5A:
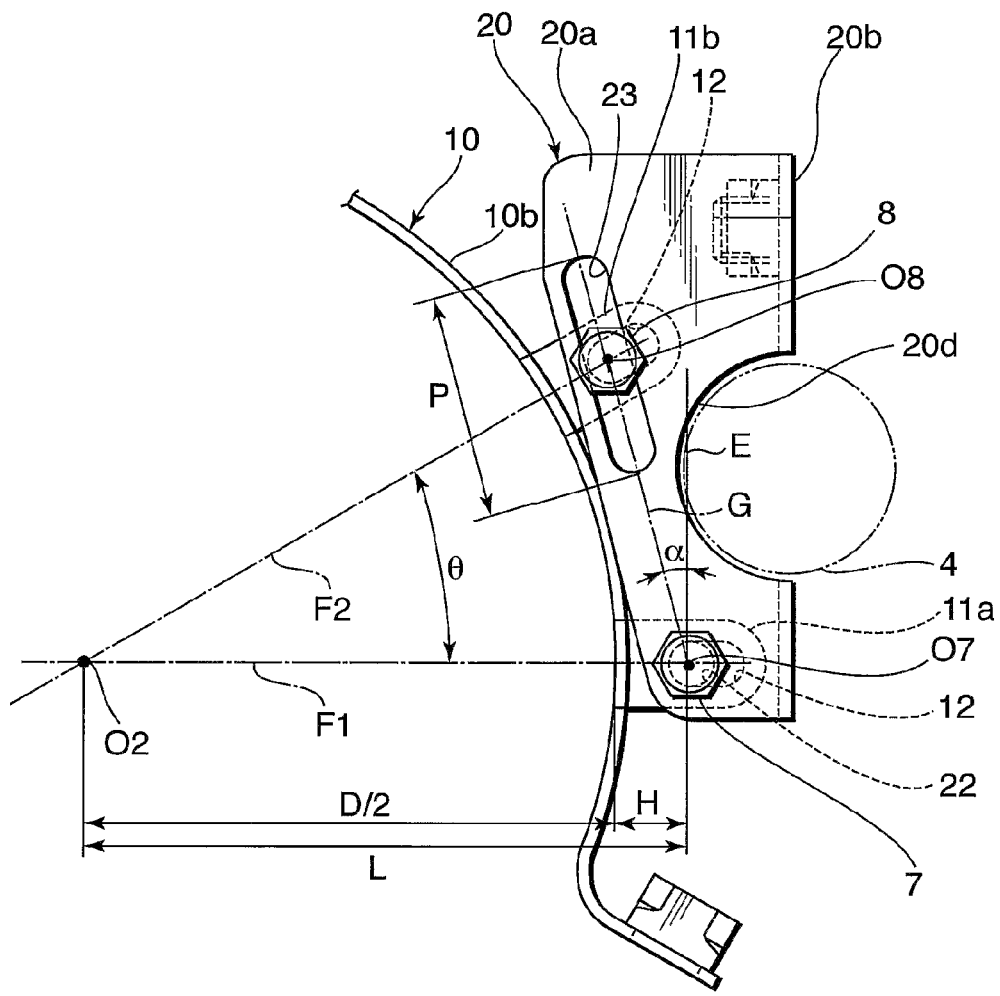
FIG. 5A and FIG. 5B are a side view of the band and the bracket, illustrating positions of tabs and bolts, and a diagram illustrating a positional relationship between the bolts, according to the embodiment of this invention.

Referring to FIG. 5A, an angle θ is formed by a straight line F1 linking the central axis O2 of the cylinder tube 2 to a center O7 of the fixing holes 12 in the pair of first tabs 11a and a straight line F2 linking the central axis O2 of the cylinder tube 2 to a center O8 of the fixing holes 12 in the pair of second tabs 11b. The angle θ corresponds to the aforementioned angular interval between the pair of first tabs 11a and the pair of second tabs 11b.

In this pipe fixing structure, bands 10 having different diameters are used in accordance with variation in the outer diameter D of the cylinder tube 2. As regards the bracket 20, on the other hand, the same bracket 20 is used in relation to bands 10 having different diameters.

In the figures, the second bolt 8 penetrates the center of the elliptical second bolt hole 23. The outer diameter D of the cylinder tube 2 at this time is set as a standard diameter. When the band 10 is used on a cylinder tube 2 having a larger outer diameter D than the standard diameter, a band 10 having a correspondingly larger diameter is used. In this case, the position in which the second bolt 8 penetrates the second bolt hole 23 is displaced from the center of the second bolt hole 23 in a direction heading away from the first bolt hole 22. Conversely, when the outer diameter D of the cylinder tube 2 is smaller than the standard diameter, a band 10 having a correspondingly smaller diameter is used. In this case, the position in which the second bolt 8 penetrates the second bolt hole 23 is displaced from the center of the second bolt hole 23 in a direction approaching the first bolt hole 22.

In this way, bands 10 having different diameters are used in accordance with differences in the outer diameter D of the cylinder tube 2. Regardless of the diameter of the band 10, formation positions of the first tabs 11a and second tabs 11b are set in advance such that the angle θ between the straight lines F1 and F2 remains constant.

Meanwhile, to ensure that the same bracket 20 can be used in the pipe fixing structure regardless of differences in the diameter of the band 10, an angle α formed by a straight line E that passes through the center O7 of the first bolt 7 orthogonally to the straight line F1 and the aforesaid bolt hole base line G is set to be ½ the angle θ formed by the straight lines F1 and F2.

In the figures, a distance from the central axis O2 of the cylinder tube 2 to the center O7 of the first bolt 7 is set to be equal to a distance from the central axis O2 of the cylinder tube 2 to the center O8 of the second bolt 8. This distance is set as L. The distance L is expressed by a following equation.

$$L=D/2+H$$

where, H=a distance from the outer peripheral surface 2a of the cylinder tube 2 to the center O7 of the first bolt 7 or the center O8 of the second bolt 8.

The distance H is set in advance such that the pipe 4 does not interfere with the cylinder tube 2. The distance H remains constant regardless of the diameter of the band 10.

Figure 5B:
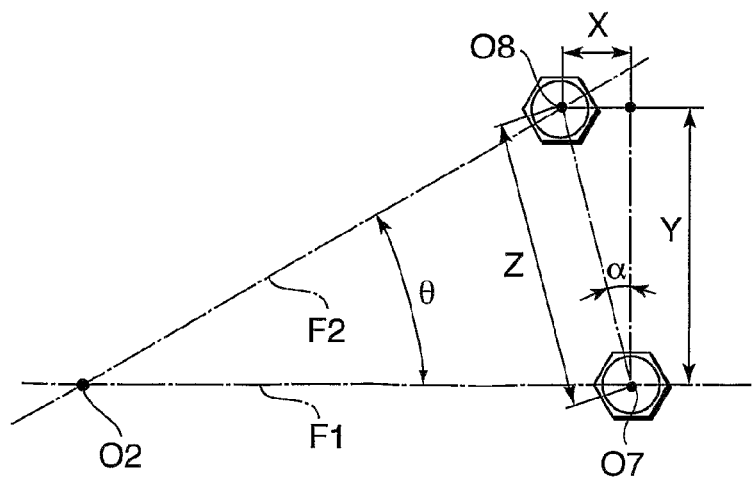

Referring to FIG. 5B, a distance X between the center O7 of the first bolt 7 and the center O8 of the second bolt 8 along the straight line F1 is expressed by a following equation.

$$X=L\cdot(1-\cos\theta)$$

A distance Y between the center O7 of the first bolt 7 and the center O8 of the second bolt 8 along the straight line E, which is orthogonal to the straight line F1, is expressed by a following equation.

$$Y=L\cdot\sin\theta$$

Further, a distance Z between the center O7 of the first bolt 7 and the center O8 of the second bolt 8 is expressed by a following equation.

$$Z=\sqrt{\sqrt{2\cdot(1-\cos\theta)}}$$

When bands 10 of different diameters are used, the distance Z also varies. A length P of the second bolt hole 23 is therefore set in accordance with a maximum value and a minimum value of the distance Z.

As described above, in this pipe fixing structure, the first tabs 11a and second tabs 11b are disposed such that the angle θ and the distance H are respectively maintained at constant values in relation to bands 10 of different diameters, while the second bolt hole 23 in the bracket 20 is formed as an elongated hole extending along the bolt hole base line G.

By performing setting in this manner, the bracket 20 fixed to the bands 10 of various diameters maintains the angle α and the distance H shown in FIG. 5A relative to the band 10 at all times. Therefore, even when the pipe 4 is fixed to a cylinder tube 2 having a different outer diameter D, the distance and position relationship between the cylinder tube 2 and the pipe 4 can be kept constant at all times using the same bracket 20.

It should be noted that the second bolt hole 23 may be formed as a rounded hole rather than an elongated hole and the first bolt hole 22 may be formed as an elongated hole extending along the bolt hole base line G.

According to the pipe fixing structure described above, by employing the bands 10 of different diameters and the single bracket 20, pipes 4 of various radii R can be fixed to cylinder tubes 2 of various outer diameters D while maintaining a constant distance and position relationship relative thereto. Therefore, the number of components required in the pipe fixing structure can be reduced, enabling a reduction in the cost of fixing the pipe 4 to the cylinder tube 2.

Further, the band 10, the bracket 20, and the clamp 40 are respectively formed by press-molding sheet metal cut into predetermined shapes, and therefore the constitutional components of the pipe fixing structure can be manufactured easily and at a low weight. The bracket 20 is formed with an inverted U-shaped cross-section constituted by the two leg plate portions 20a fixed to the tabs 11a, 11b and the top plate portion 20b joining the leg plate portions 20a, and therefore the pipe 4 can be supported with a high degree of rigidity.

In this embodiment, the bracket 20 supports the single pipe 4, but the bracket 20 may support a plurality of pipes.

In this embodiment, the bracket 20 is fixed to the band 10 by screwing the nut 17 (18) to the bolt 7 (8) that penetrates the pair of tabs 11a (11b) and the two leg plate portions 20a of the bracket 20. However, the bracket 20 may be fixed to the band 10 using a total of four bolts and four nuts by joining one of the tabs 11a (11b) and one of the leg plate portions 20a with a bolt and a nut. In this case, each leg plate portion 20a is fixed to each tab 11a (11b) individually, and therefore a further improvement in support rigidity can be achieved in relation to a collapsing direction of the leg plate portions 20a.

Further, the structure for fixing the bracket 20 to the band 10 is not limited to a fixing structure using a bolt and a nut.

In this embodiment, the base portion 40a of the clamp 40 is supported on the top plate portion 20b by a cantilever structure fixed by the bolt 9 and the nut 19. However, a separate base portion may be provided on a tip end of the tip end portion 40b on the opposite side of the clamp 40 to the base portion 40a, and the two base portions may be fixed to the bracket 20 individually by bolts.

Figure 6:
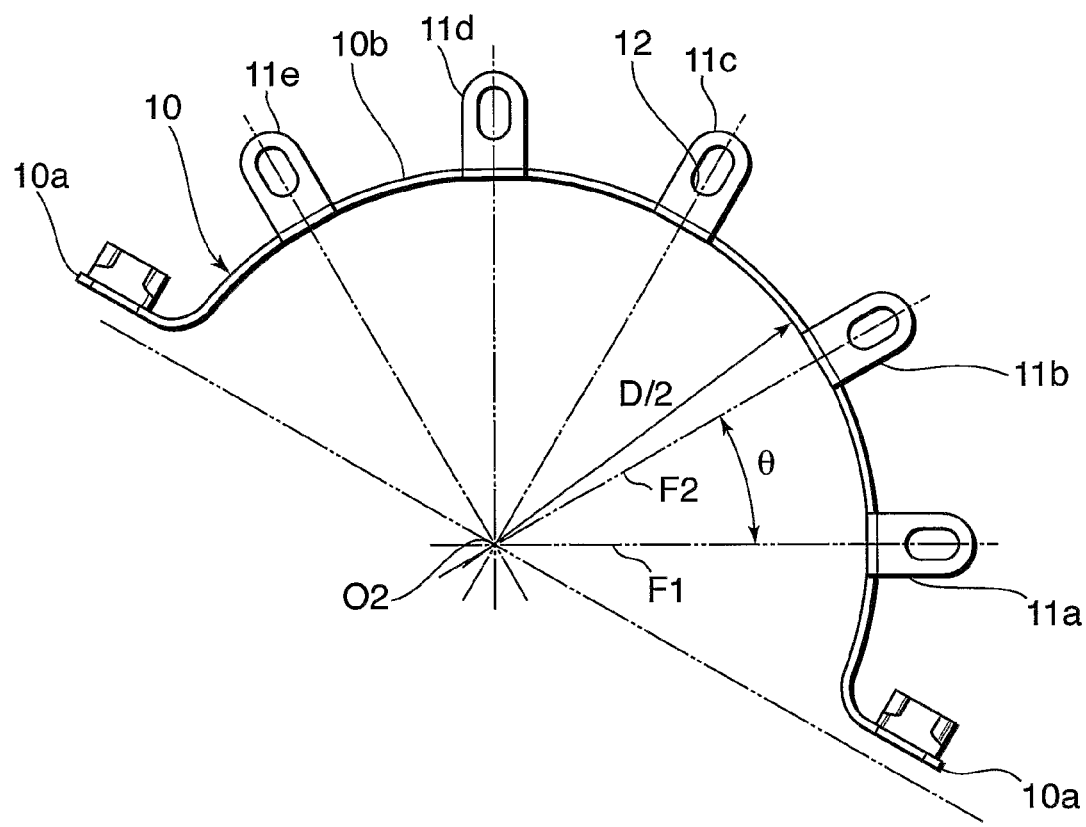
FIG. 6 is a side view of a band according to another embodiment of this invention.

Referring to FIG. 6, a second embodiment of this invention relating to the constitution of the band 10 will be described.

Five pairs of tabs 11a-11e are formed at equal angular intervals θ around the outer periphery of the main body portion 10b of the band 10 according to this embodiment. By forming three or more pairs of tabs on the outer periphery of the main body portion 10b in this manner, the number of options relating to the position in which the bracket 20 is attached to the band 10 in the circumferential direction can be increased. Further, when four or more pairs of tabs are formed on the outer periphery of the main body portion 10b, two brackets 20 can be fixed to a single band 10.

The contents of Tokugan 2009-104887 and Tokugan 2009-104889, with a filing date of Apr. 23, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, this invention is applied to a fluid pressure cylinder for a working machine, but the scope of application of this invention is not limited thereto.

The embodiments of this invention in which an exclusive property or privilege is claimed are defined as follows:

1. A pipe fixing structure that supports a pipe on a cylinder tube, comprising:
    a band fastened to an outer periphery of the cylinder tube and comprising a first tab that projects outward in a radial direction and a second tab that projects outward in the radial direction, the first tab and the second tab forming a part of the band; and
    a bracket constituted by a pair of leg plate portions, fixed to the first tab and the second tab, and a top plate portion formed integrally with the leg plate portions; and
    a clamp comprising a base portion, which is fixed to the top plate portion, and a tip end portion formed integrally with the base portion so as to sandwich the pipe between the tip end portion and the top plate portion.

2. The pipe fixing structure as defined in claim 1, wherein the bracket includes a notch for supporting the pipe, the notch having an arc-shaped cross-section that is oriented outward when seen from an axial direction of the cylinder tube in a state where the pair of leg plate portions are fixed to the first tab and the second tab.

3. The pipe fixing structure as defined in claim 1, wherein the band and the bracket are respectively formed by press-molding.

4. A pipe fixing structure that supports a pipe on a cylinder tube, comprising:
- a band fastened to an outer periphery of the cylinder tube and comprising a first tab that projects outward in a radial direction and a second tab that projects outward in the radial direction; and
- a bracket that supports the pipe, wherein the bracket is formed with an inverted U-shaped cross-section constituted by a pair of leg plate portions and a top plate portion formed integrally with the leg plate portions to join the leg plate portions, and the pair of leg plate portions fixed to the first tab and the second tab by a bolt, wherein the cylinder tube has a central axis,
the bracket includes a first bolt hole and a second bolt hole,
a fixing hole is formed in each of the first tab and the second tab,
the fixing hole in the first tab and the fixing hole in the second tab form an angle $\theta$ about the central axis,
the pipe fixing structure including a first bolt that penetrates the first bolt hole and the fixing hole in the first tab to fix the bracket to the first tab and a second bolt that penetrates the second bolt hole and the fixing hole in the second tab to fix the bracket to the second tab,
at least one of the first bolt hole and the second bolt hole is formed as an elongated hole extending in a direction of a bolt hole base line linking a center of the first bolt hole to a center of the second bolt hole, and
an angle $\alpha$ formed by the bolt hole base line and a straight line that is orthogonal to a straight line linking the central axis to a center of the fixing hole in the first tab and passes through a center of the first bolt is set at $\alpha=\frac{1}{2}\times\theta$.

5. The pipe fixing structure as defined in claim 4, wherein the band comprises:
- a pair of first tabs disposed such that the fixing holes thereof overlap on an axis which is parallel to the central axis; and
- a pair of second tabs disposed such that the fixing holes thereof overlap on an axis which is parallel to the central axis, the first bolt hole is formed in each of the pair of leg plate portions,
the second bolt hole is formed in each of the pair of leg plate portions,
the first bolt penetrates the first bolt holes in the pair of leg plate portions and the fixing holes in the pair of first tabs, and
the second bolt penetrates the second bolt holes in the pair of leg plate portions and the fixing holes in the pair of second tabs.

6. The pipe fixing structure as defined in claim 5, wherein the band includes three or more pairs of tabs disposed at angles $\theta$ in a circumferential direction.

7. The pipe fixing structure as defined in claim 5, wherein the fixing holes in the first tabs and the fixing holes in the second tabs are all formed as elongated holes extending in the radial direction.

8. The pipe fixing structure as defined in claim 1, wherein the top plate portion is formed to be flat, the bracket includes a notch having an arc-shaped cross-section that is oriented outward when seen from an axial direction of the cylinder tube in a state where the pair of leg plate portions are fixed to the first tab and the second tab, and the tip end portion has an arc-shaped cross-section corresponding to the notch such that the clamp sandwiches the pipe between the notch and the tip end portion.

9. The pipe fixing structure as defined in claim 1, wherein the band has an arc-shaped cross-section of substantially 180 degrees and includes a joining hole in either circumferential direction end thereof, and by disposing a pair of the bands on the outer periphery of the cylinder tube such that the respective joining holes oppose each other and fastening the opposing joining holes together using a bolt and a nut, the bands are fixed to the outer periphery of the cylinder tube.

10. A fluid pressure cylinder that supports a pipe on a cylinder tube, comprising:
- a band fastened to an outer periphery of the cylinder tube comprising a first tab that projects outward in a radial direction and a second tab that projects outward in the radial direction, the first tab and the second tab forming a part of the band;
- a bracket
- constituted by a pair of leg plate portions, fixed to the first tab and the second tab, and a top plate portion formed integrally with the leg plate portions; and
- a clamp comprising a base portion, which is fixed to the top plate portion, and a tip end portion formed integrally with the base portion so as to sandwich the pipe between the tip end portion and the top plate portion.

* * * * *